United States Patent [19]
Rottmayer et al.

[11] Patent Number: 5,784,224
[45] Date of Patent: *Jul. 21, 1998

[54] COMPACT READ/WRITE HEAD HAVING BIASED GMR ELEMENT

[75] Inventors: Robert E. Rottmayer, Fremont, Calif.; Jian-Gang Zhu, St. Paul, Minn.

[73] Assignee: Read-Rite Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 682,270

[22] Filed: Jul. 17, 1996

Related U.S. Application Data

[62] Division of Ser. No. 337,878, Nov. 14, 1994, Pat. No. 5,576,914.

[51] Int. Cl.⁶ .................... G11B 5/127; G11B 5/33
[52] U.S. Cl. .......................................... 360/113
[58] Field of Search .................... 360/113, 55, 110, 360/119, 120, 122, 125, 126; 324/252; 338/32 R

[56] References Cited

U.S. PATENT DOCUMENTS

| | | | |
|---|---|---|---|
| 4,881,143 | 11/1989 | Bhattacharyya et al. | 360/113 |
| 5,251,088 | 10/1993 | Coutellier et al. | 360/113 |
| 5,373,238 | 12/1994 | McGuire et al. | 360/113 |
| 5,465,185 | 11/1995 | Heim et al. | 360/113 |
| 5,576,914 | 11/1996 | Rottmayer et al. | 360/113 |

*Primary Examiner*—John H. Wolff
*Attorney, Agent, or Firm*—Nathan N. Kallman

[57] ABSTRACT

A compact read/write head is provided having a biased GMR element. Biasing of the GMR element provides distinguishable response to the rising and falling edges of a recorded pulse on an adjacent medium. It also improves the linearity of the response and helps to reduce noise.

7 Claims, 13 Drawing Sheets

COMPACT READ/WRITE HEAD HAVING BIASED GMR ELEMENT

CROSS-REFERENCE TO RELATED APPLICATION

This application is a division of application Ser. No. 08/337,878, filed Nov. 14, 1994 now U.S. Pat. No. 5,576,914.

U.S. patent application Ser. No. 08/203,225 which issued as U.S. Pat. No. 5,446,613 on Aug. 29, 1995 entitled MAGNETIC HEAD ASSEMBLY WITH MR SENSOR was filed Feb. 28, 1994 on behalf of Robert Rottmayer and is assigned to the assignee of the present application. The subject matter of the copending application is related to the present application and is incorporated herein by reference.

FIELD OF THE INVENTION

This invention relates to thin film magnetic heads and in particular to a method of manufacture and to a structure for a thin film magnetic head incorporating an inductive write head and a magnetoresistive (MR) read head.

DESCRIPTION OF THE PRIOR ART

Presently known thin film magnetic heads include an inductive write head and an MR head used for reading recorded signals. Write operations are carried out inductively using a pair of magnetic write poles. These magnetic write poles form a magnetic path and define a transducing nonmagnetic gap in the pole tip region. The poles are in contact at a back closure region. The transducing gap is positioned to fly close to the surface of an adjacent recording medium (e.g., a magnetic disk). An electrical coil or winding is formed between the poles and insulated therefrom for providing current representative of signal information and to cause flux flow in the magnetic path of the poles. The varying flux results in recording of the signal information onto the magnetic medium, which is moving or rotating closely adjacent to the magnetic head structure.

Read operations are carried out by a magnetoresistive (MR) element which is spaced from a pair of magnetic shields. A sensing electric current is passed through the MR element for sensing the resistance of the MR element. The resistance of the MR element changes in response to changes in magnetic flux or transitions received from the adjacent medium. The shields protect the MR element from stray flux.

Conventionally, the MR element was electrically isolated from the pair of magnetic shields and a separate set of conductors were provided on one surface of the MR element to pass a reference current through the MR element in a so-called 'CIP' mode (Current In the Plane mode). The CIP mode created problems such as shorting due to electromigration. The CIP style MR element was relatively large in size and expensive to mass produce because of its complex construction.

More recently, a compact MR head has been developed in which the magnetic write poles serve also as the shields for the MR element and further as a means for conducting the MR sense current. The structure and method of forming such a compact MR head is disclosed in the above-cited U.S. Pat. No. 5,446,613.

In brief the compact MR head of U.S. Pat. No. 5,446,613 may be described as follows. Thin-film deposition and photolithographic techniques are used to define on a ceramic substrate, a block-shaped layered structure which has as its layers, in bottom to top order:

(a) a bottom pole/shield layer made of a magnetically and electrically conductive material;
(b) a bottom contact layer made of a magnetically nonconductive but electrically conductive material;
(c) a Giant MR element (GMR) arranged to operate in a mode known as CPP (Current flowing Perpendicularly through the major Plane);
(d) a top contact layer made of a magnetically nonconductive but electrically conductive material; and
(e) a top pole/shield layer made of a magnetically and electrically conductive material that is separated from the bottom pole/shield layer both by a an operational transducing forward gap and also by a countering back gap.

The GMR element is typically formed in a patterned multilayer structure, which may use Cu/Co or Fe/Cr material, for example. In keeping with this invention, the GMR film is oriented so that the bias current that is applied to the GMR film is perpendicular to the plane of the film, or in a Cpp mode.

Read current flows perpendicularly through the GMR element by way of the electrically-conductive pole/shields and contact layers. A read sense circuit is coupled to the upper and lower pole/shields for detecting magnetoresistive fluctuations. Write flux flows across the forward gap when electric current is passed through an electrical coil formed about the back gap of the compact GMR head structure.

While the compact GMR head structure of U.S. Pat. No. 5,446,613 is highly advantageous, further improvements can be made. In particular, it has been discovered that read noise can be reduced and the linearity and gain of the GMR response can be improved as disclosed below.

SUMMARY OF THE INVENTION

In accordance with this invention, a compact read/write head includes a magnetically biased GMR element and provides reduced noise in the read signal and improves the linearity and gain of flux sensing. The MR element is magnetically biased such that the major domains of the alternating MR layers define a scissor-type configuration when no excitation field is supplied by an adjacent medium. The major domain region of a first layer of the MR element is preferably biased so as to be rotated +45° relative to its unbiased orientation by the bias field. The major domain region in an adjacent second layer of the MR element is preferably biased so as to be rotated –45° relative to its unbiased orientation by the bias field. This produces an angle difference of approximately 90° between the major domain regions of the first and second layers due to the bias. The cosine of this bias-induced angle difference (90°) is approximately zero.

When an excitation field is supplied by the adjacent medium, it rotates the scissor configuration from the crossed (90°) state towards either a closed (0) state or an anti-parallel (180°) state, depending on the polarity of the excitation field. The resultant change in cosine (and resistance of the MR element which is a function of cosine) is therefore from zero to a positive one (cosine 0°=+1.0) or to a negative one (cosine 180°=–1.0). And the resultant change in resistance of the MR element therefore indicates the polarity of change of the excitation field.

Additional advantages of the biased into scissor configuration are improved sensitivity and linear response to low level excitation fields and reduction in noise from edge effects.

A structure in accordance with the invention includes: (a) a GMR element; (b) a pair of pole elements positioned about the GMR element for acting as shields and for simultaneously supplying sense current during a read mode and for further generating write flux during a write mode; (c) a soft magnetic element positioned adjacent to the GMR element for applying a magnetic bias of predefined orientation to the GMR element during the read mode; and (d) an antiferromagnetic exchange element positioned adjacent to the soft element for orienting the magnetic domains of the soft element along said predefined orientation.

A manufacturing method in accordance with the invention comprises the steps of: (a) providing a substrate; (b) disposing a magnetoresistive element on the substrate; and (c) further disposing a biasing element on the substrate, adjacent to the magnetoresistive element, for applying a magnetic bias to the magnetoresistive element. The bias element can be a permanent magnet, or a combination of a pre-oriented exchange layer and a soft layer, or an electric current source which induces the magnetic bias field, or a combination of one or more of these bias-providing means.

BRIEF DESCRIPTION OF THE DRAWINGS

The invention will be described in greater detail with reference to the drawings in which.

DETAILED DESCRIPTION

Figure 1A:
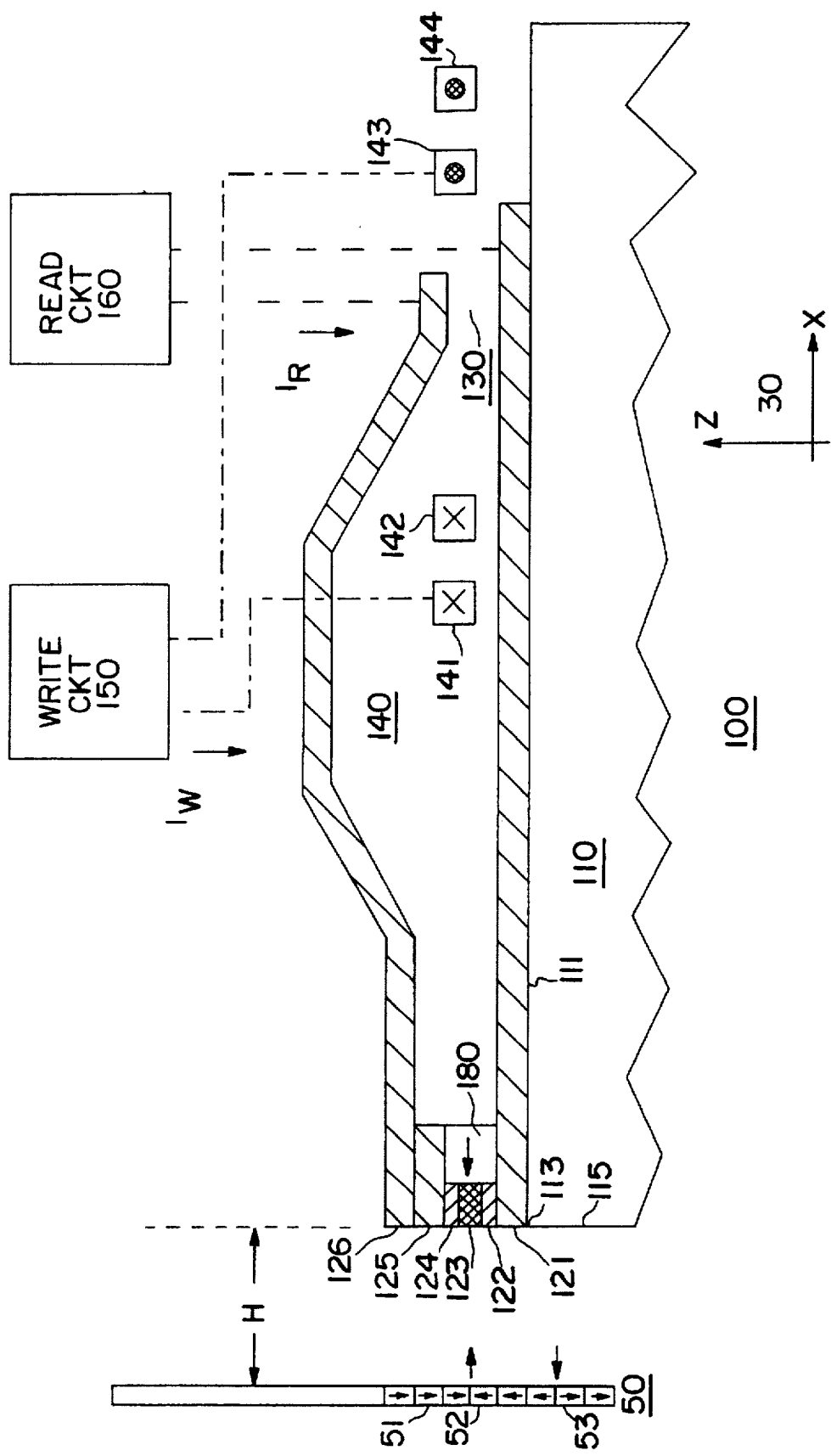
FIG. 1A is a cross-sectional side view showing a biased GMR head structure, in accordance with the invention.

FIG. 1A shows a cross-sectional view of a head structure 100 in accordance with the invention and a magnetic medium 50 adjacent to the head 100.

For purposes of reference, a Cartesian coordinate grid is shown at 30 having an upwardly extending Z axis and an X axis extending to the right. The Y axis is understood to extend orthogonally relative to the Z and X axes, inwardly into the plane of FIG. 1A.

Magnetic medium 50 has a plurality of pre-oriented flux regions 51 defined on its surface, each directed either in the +Z direction or the -Z direction. For purpose of example, a first transition 52 that is defined by opposingly-oriented flux regions 51 is shown producing a first fringe field extending in the +X direction beyond the medium. A second transition 53 that is defined by other opposingly-oriented flux regions 51 is shown producing a second fringe field extending in the -X direction.

The magnetic medium 50 moves relative to the head structure 100 along the Z direction (+Z or -Z). The head structure 100 is spaced away from the magnetic medium 50 in the X direction by an aerodynamically-defined flying height, H.

As the head structure 100 is passed by transition regions 52 and 53, a magnetoresistive portion 123 of the head structure 100 detects the flux or fringe fields and responds by changing its resistance.

A slider-shaped substrate 110 made of a magnetically nonconductive material such as ceramic forms a bulk portion of the head structure 100 and provides the aerodynamic lift. For reasons of illustrative simplicity, the bulk of the aerodynamic substrate 110 is not shown.

The substrate 110 has a substantially planar top surface 111 extending in the X direction and a medium-facing sidewall 115 cut substantially at right angles to the top surface 111 so as to extend in the Z direction. The end of the substrate top surface 111 that meets with the substrate sidewall 115 is referred to herein as the forward edge 113.

A first pole/shield layer 121, made of a material that is both magnetically and electrically conductive (an EC/MC material), is formed conformably on the substrate top surface 111 extending to the forward edge 113. The material of the first pole/shield layer 121 can be a nickel-iron composition, such as Permalloy, or a ferromagnetic material with high permeability. The Z direction thickness of the first pole/shield layer 121 is preferably in the range of 0.5 to 10 microns and more preferably in the range of 2 to 3 microns.

The abbreviation form, Ex/Mx will be used below to describe the electrical and magnetic conductivity properties of various materials, with x=C meaning it is conductive, x=N meaning it is nonconductive, and x=X meaning it can be either. Thus EN/MC means, electrically nonconductive and magnetically conductive. EX/MN means the material is either electrically conductive or nonconductive, but it is magnetically nonconductive.

A first contact element 122, made of an electrically conductive but magnetically nonconductive material (an EC/MN material), is formed over a forward portion of the first pole/shield layer 121, near the substrate's forward edge 113. The first contact element 122 can be composed of one or a combination of EC/MN materials selected for example from the group consisting of: copper (Cu), gold (Au), silver (Ag), and alloys of these metals. The Z direction thickness of the first contact element 122 is preferably in the range of 100 Å to 2000 Å and more preferably in the range of 300 Å to 1500 Å.

A giant magnetoresistive (GMR) element 123 is formed over the first contact element 122. The GMR element 123 may be formed, by way of example, by depositing a plurality of alternating ultra-thin layers of magnetically conductive and nonconductive materials such cobalt (Co) and copper (Cu), each layer being approximately 20 Angstroms thick. As known, the electric resistance of such a GMR element 123 fluctuates when exposed to a time-varying magnetic flux. Unlike inductive transducers, a magnetoresistive element is sensitive to the magnitude of a flux transition rather than to the rate of change of the flux transition. This gives magnetoresistive elements certain advantages over inductive transducers, such as insensitivity to disk speed changes.

The overall Z direction thickness of the GMR element 123 is preferably in the range of 60 Å to 1000 Å and more preferably in the range of 100 Å to 500 Å.

A second contact element 124, made of an EC/MN material that is the same or equivalent to that of the first contact element 122, is formed over the GMR element 123. The Z direction thickness of the second contact element 124 is substantially the same as that of the first contact element 122.

A second pole/shield layer 125, made of an EC/MC material that is the same or equivalent to that of the first pole/shield layer 121, is formed over and the second contact element 124. The Z direction thickness of the second pole/shield layer 125 is substantially the same as or less than that of the first pole/shield layer 121.

A third pole/shield layer 126, made of an EC/MC material that is the same or equivalent to that of the first and second pole/shield layers, 121 and 125, is formed over the second pole/shield layer 125 and extended backwards (in the +X direction) to define a back gap 130 with the first pole/shield layer 121. The Z direction thickness of the third pole/shield layer 126 is substantially the same as or greater than that of the first pole/shield layer 121.

The back gap 130 is filled with a material that is at least electrically nonconductive (EN/MX material) and more preferably with a material that is both magnetically and electrically nonconductive (EN/MN) such as $Al_2O_3$, hard-baked resist or BCB (benzocyclobutene available from Dow Chemical Corp.).

Figure 1B:
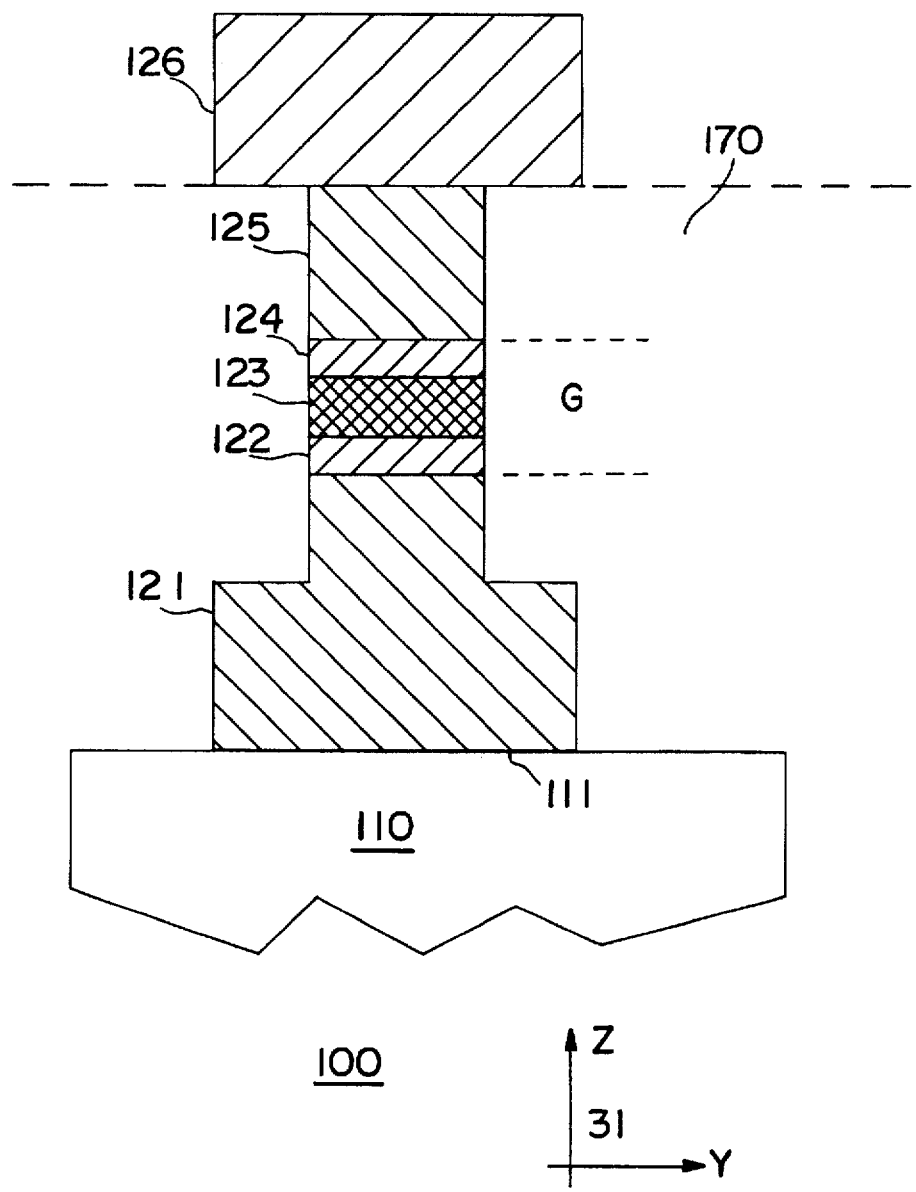
FIG. 1B is an exemplary front plan view for the biased GMR head structure of FIG. 1A.

The space at the forward edge 113, between the top of the first pole/shield layer 121 and the bottom of the second pole/shield layer 125 defines a forward write gap (G in FIG. 1B). The dimension of the forward gap G is defined by the combined Z direction thicknesses of the first contact element 122, the GMR element 123 and the second contact element 124.

The Z dimension of the back gap 130 should be no more than that of the forward gap and is more preferably made as small as possible while still assuring electrical insulation between the first and third pole/shield layers, 121 and 126.

Referring to FIG. 1B, which shows a preferred front plan view of a relevant portion of the head structure 100 as seen in the Y-Z plane 31, elements 121 through 126 preferably define an I-beam profile. The Y direction width in the stem portion of the I-beam profile, which is defined by an upper part of element 121 and elements 122 through 125, is preferably 20 to 100 microns and more preferably in the range of 3 to 5 microns. The bottom and top caps of the I-beam profile, which are defined respectively by an upper part of element 121 and element 126, are wider, preferably by a factor of 1.5 to 2 times as much.

The Z direction height of element 125 (the second pole/shield layer) in FIG. 1B is preferably 1 to 10 times G, and more preferably approximately 3 times G. The Z direction height of the upper, stem-forming portion of element 121 (the first pole/shield layer) similarly, is preferably 1 to 10 times G, and more preferably approximately 3 times G.

Although not fully shown, a EN/MN fill and planarizing structure 170 composed of one or more materials such as $Al_2O_3$, hard-baked resist or BCB surrounds the I-beam profile from the substrate top surface 111 to at least the bottom of the third pole/shield layer 126. The third pole/shield layer 126 can also be shrouded by a passivating EN/MN material if desired.

Referring again to FIG. 1A, the X direction length of elements 122 through 125 is preferably 50 to 200 microns and more preferably in the range of 100 to 150 microns. As seen in FIG. 1A, the first and third pole/shield layers, 121 and 126, extend in the +X direction beyond sandwiched elements 122 through 125.

A planar coil 140 having electrically conductive winding members such as indicated at 141-144 is formed about the back gap 130 and electrically insulated from the first and third pole/shield layers, 121 and 126, by the EN/MN fill and planarizing structure 170 or another appropriate EN/MN support structure.

A write circuit 150 connects to opposed ends of the coil 140 (e.g., to members 142 and 144 in the case where the coil has spiral-shaped top view), and during a write mode sends electrical current $I_W$ passing in a first direction (+Y) through winding members 141-142 positioned on a forward side of the back gap 130 and sends electrical current passing in a second direction (-Y) through winding members 143-144 positioned on a rear side of the back gap 130, to thereby induce flux flow through the forward and back gaps. Changes in flux flow across the forward gap produce the different magnetic orientations of magnetized regions 51 in the magnetic medium 50 during a write operation.

A read circuit 160 connects to opposed back ends of the first and third pole/shield layers, 121 and 126, and during a read mode sends a sensing electric current $I_R$ passing in the Z direction through sandwiched elements 122 through 125. Note that the read-sense current $I_R$ flows perpendicularly through the GMR element 123 thus avoiding the along-the-plane electromigration problems and magnetic-biasing due-to parallel-current problems associated with earlier designs based on CIP operation (Current In the Plane mode).

An electrically nonconductive, magnetic biasing element 180 is positioned behind the combination of the first contact element 122, the GMR element 123 and the second contact element 124. The biasing element 180 is also sandwiched between the first and second pole/shield layers, 121 and 125.

Biasing element 180 produces a magnetic biasing field that extends substantially along the X direction (+X or −X) into the GMR element 123 as indicated by the left-pointing arrow drawn at 180.

Figure 2A:
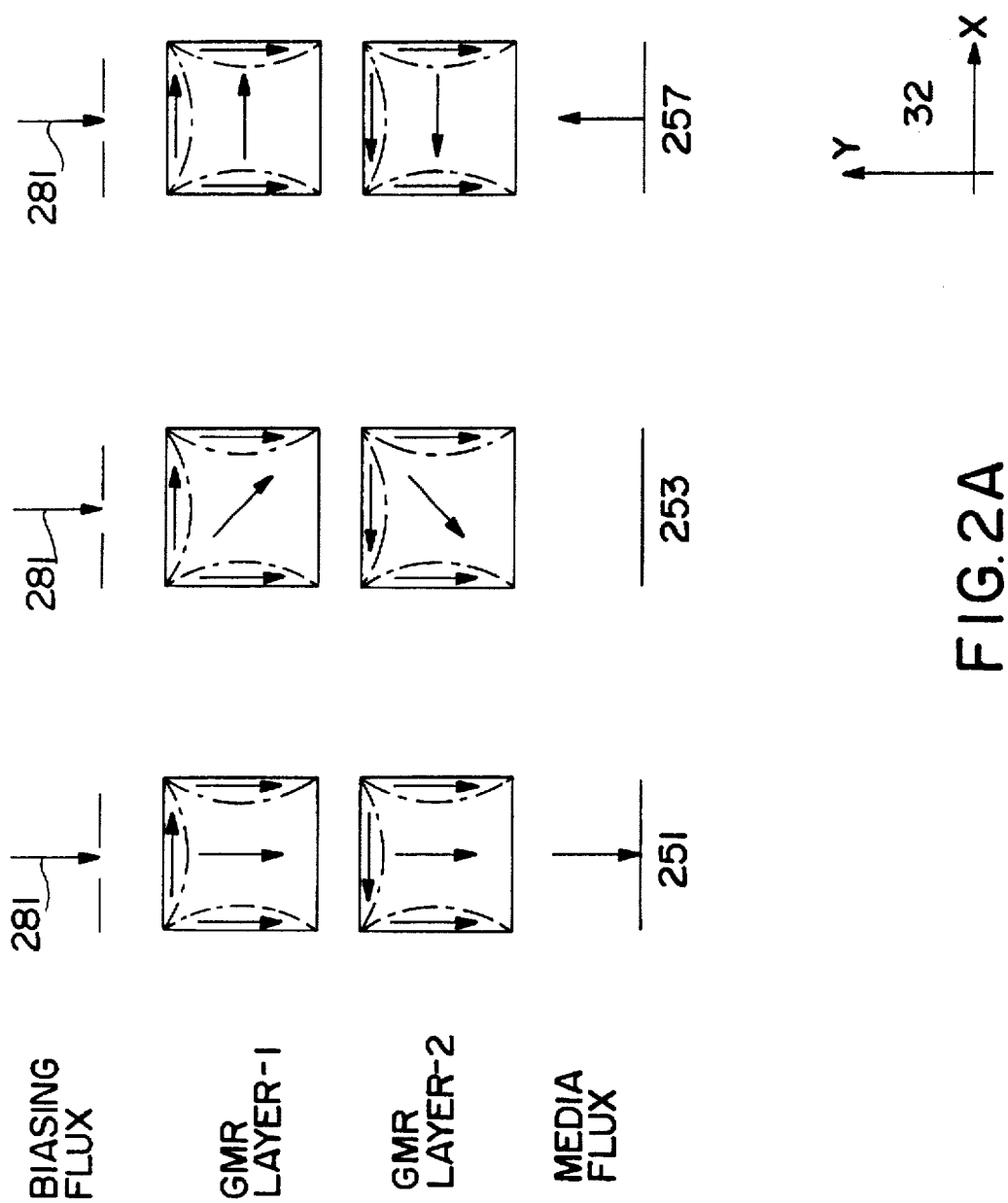
FIG. 2A diagrams a group of snapshots showing micromagnetic domain distributions in a biased GMR element as the element sweeps past flux transitions in an adjacent medium.
Figure 2B:
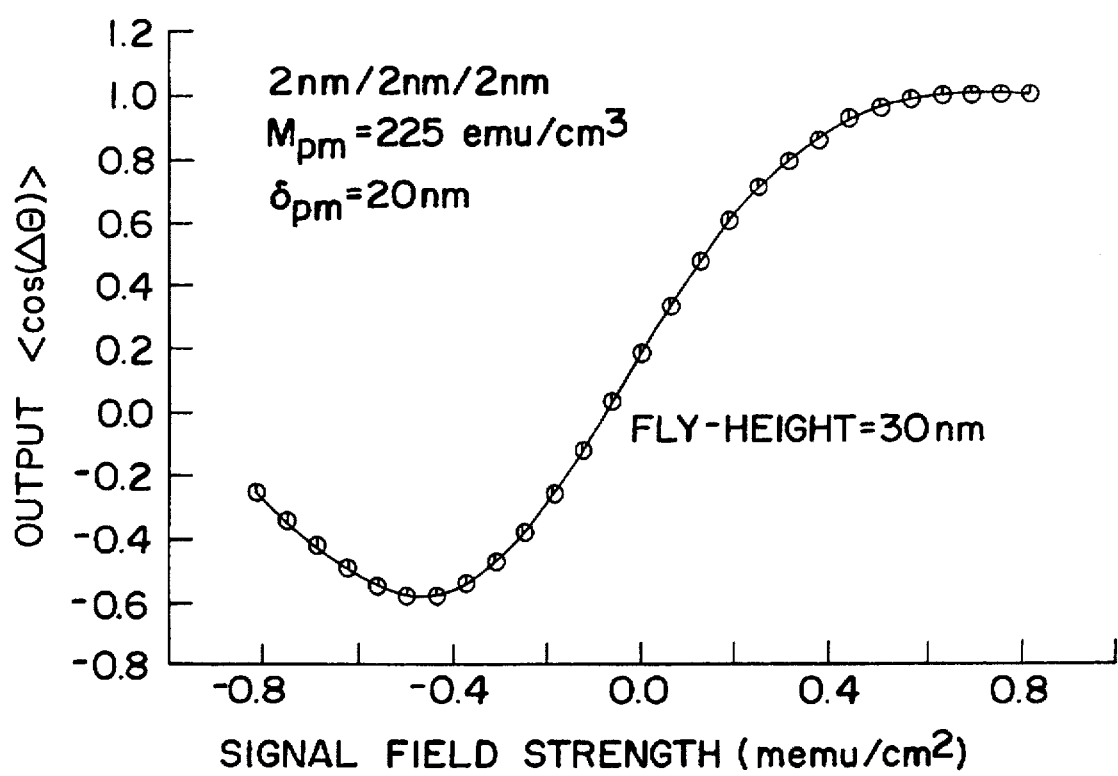
FIG. 2B is a plot of the cosine-like response of the magnetically biased GMR element to varying flux intensity.
Figure 2C:
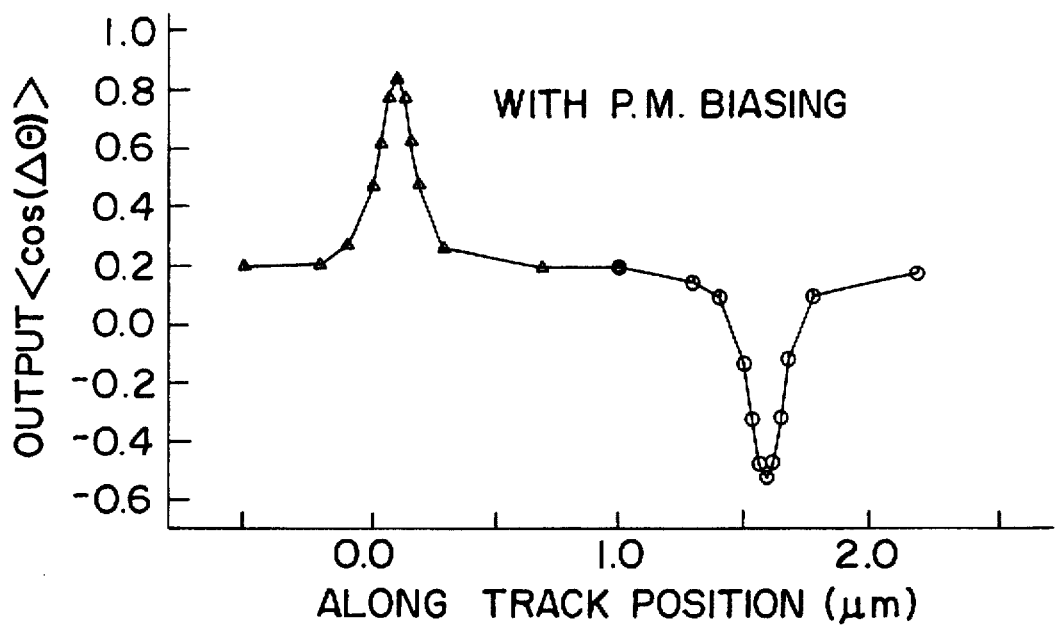
FIG. 2C is a plot of the polarity-sensitive response of the magnetically biased GMR element as that element sweeps past a set of flux transitions in a medium.
Figure 5C:
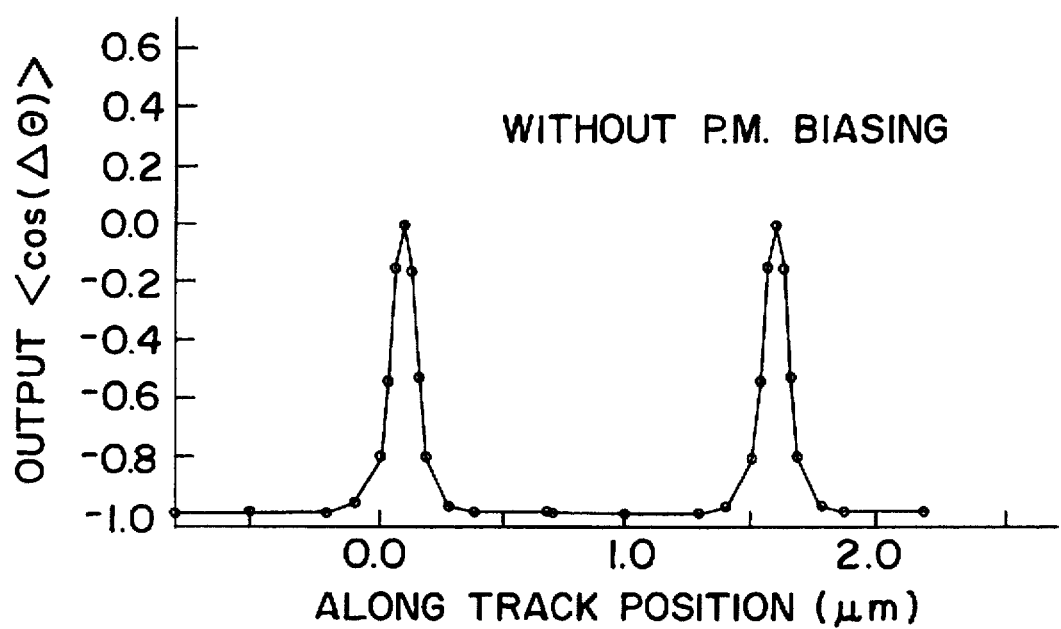
FIG. 5C is a plot of response by the nonbiased GMR element as it sweeps past a set of flux transitions in a medium.
Figure 5A:
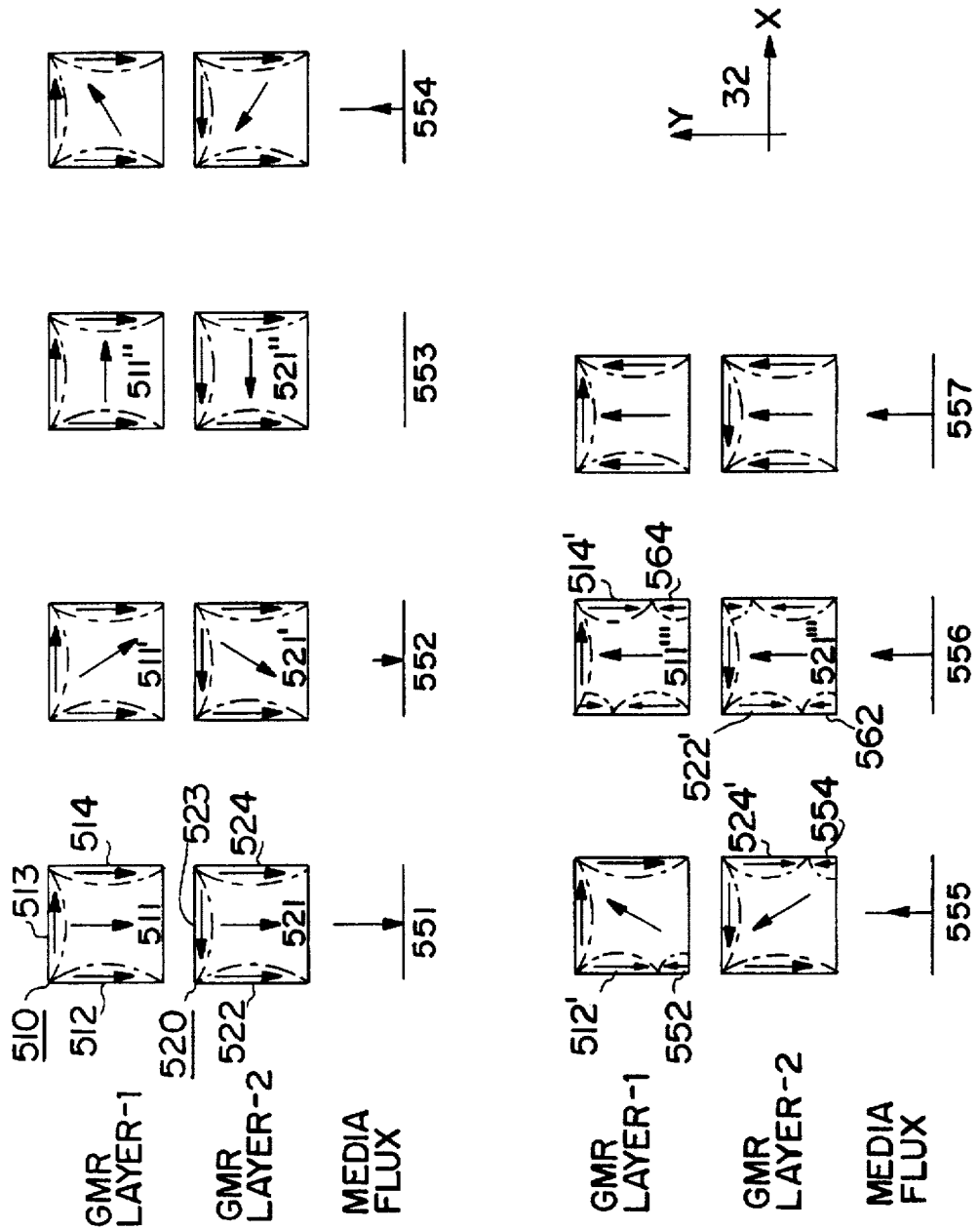
FIG. 5A is a schematic group of snapshots showing micromagnetic domain distributions in an nonbiased GMR element as it sweeps past a set of flux transitions in a medium.
Figure 5B:
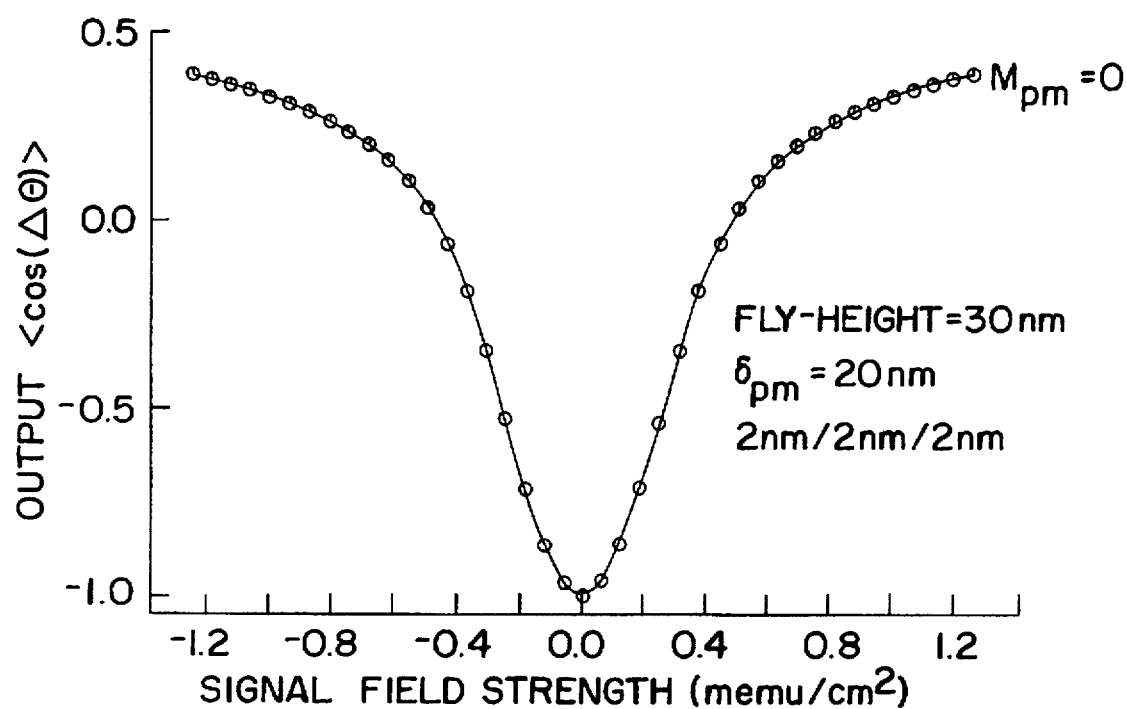
FIG. 5B is a plot of the cosine-like response of the nonbiased GMR element to varying flux intensity.

The purpose of the biasing element 180 will be explained by referring to FIGS. 2A–C and 5A–C. FIGS. 5A–C depict a 'before' situation wherein biasing element 180 is not present while FIGS. 2A–C illustrate an 'after' situation wherein biasing element 180 is present.

Referring to the 'before' illustration of FIG. 5A, a computer simulation was run to determine magnetic domain distribution in a nonbiased GMR element at the microdomain level. For simplicity, a 3-layer GMR element was assumed with magnetic/nonmagnetic/magnetic layer thicknesses of 20 Angstroms each, X and Y length and width dimensions of 0.50 micron each, a shield-to-shield gap (G) of 0.35 micron, and a flying height (H) of 500 Angstroms. The actual simulation output was color coded. FIG. 5A provides a rough, black-and-white sketch of the color coded results.

The upper left portion of FIG. 5A shows a first top-view snapshot (S-551) of magnetization conditions in two adjacent GMR layers, 510 and 520, while the head is in a first relative position $Z_R=1$ over a medium magnetization transition point 53 that produces a fringe field (excitation field from media) 551 with downward orientation.

It is understood that GMR layers 510 and 520 actually overlap each other when viewed in the XY plane 32 (they are stacked one on the next in the Z direction), but in order to see what is happening in each of these GMR layers, we have separated them apart one above the other in the illustration. The external excitation field 551 produced by the medium 50 extends in the XY plane from the medium into the overlapped GMR layers 510 and 520.

For simplicity sake, each snapshot will be referred to by the same reference number as that of its media excitation field, preceded by the prefix, 'S-'. Thus, snapshot S-551 refers to the snapshot in the upper left of FIG. 5A having media excitation field 551.

The downward-pointing arrow in subregion 511 of snapshot S-551 indicates the magnetic orientations of domains in a central main portion of the first GMR layer 510. As seen, the magnetic orientations of subregion 511 are aligned in snapshot S-551 with the magnetic orientation of the corresponding medium excitation field 551.

The downward-pointing arrow in subregion 521 of snapshot S-551 indicates the magnetic orientations of domains in a central main portion of the second GMR layer 520. As seen, the magnetic orientations of subregion 521 are also aligned with the magnetic orientation of the corresponding media excitation field 551. The angle difference between the central magnetic orientations, 511 and 521, of the first and second GMR layers is therefore zero. The cosine of this angle difference is +1.0 (cos{0°}=+1.0).

The magnetic orientations of domains in edge subregions of GMR layers 510 and 520 are similarly indicated by arrows. The first GMR layer 510 has respective left, top and right edge subregions 512, 513 and 514 in snapshot S-551. The second GMR layer 520 has respective left, top and right edge subregions 522, 523 and 524 in snapshot S-551. The junctions between the central (main) subregions 511, 521 of respective GMR layers 510, 520 and their corresponding edge subregions, 512–514 and 522–524, are defined here as 'subregion walls'.

Note that the magnetic orientations of domains in the left/right side edge subregions 512, 514, 522 and 524 are aligned in snapshot S-551 with the magnetic orientation of the corresponding media excitation field 551 (pointing down). The magnetic orientations of domains in the top edge subregions 513 and 523 are oriented to opposingly point right and left due to antiferromagnetic properties of the GMR layers.

At the next snapshot S-552, the head to medium relative position has advanced to $Z_R=2$, and the underlying media excitation field 552 has decreased in intensity but still points down. (Relative positions $Z_R=1$, 2, 3, etc. are successive but not necessarily equally spaced from one another.)

The magnetic orientations of domains in edge subregions 512–514, 522–524 remain unchanged in snapshot S-552. The magnetic orientations of domains in the central subregion of the first GMR layer 510 have rotated slightly counterclockwise though, as indicated at 511', due to interaction with top edge subregion 513. The magnetic orientations of domains in the central subregion of the second GMR layer 520 have similarly rotated slightly clockwise as indicated at 521' due to interaction with top edge subregion 523. The angle difference between the central magnetic orientations, 511' and 521' is now greater than zero but less than 180°. The cosine of this angle difference is between +1.0 and −1.0.

At the third snapshot S-553, the head to medium relative position has advanced to $Z_R=3$, and the underlying media excitation field 553 has decreased in intensity to zero. The magnetic orientations of domains in edge subregions 512–514, 522–524 remain unchanged. The magnetic orientations of domains in the central subregion of the first GMR layer 510 have rotated further counterclockwise as indicated at 511" due to interaction with top edge subregion 513 and now point to the right. The magnetic orientations of domains in the central subregion of the second GMR layer 520 have rotated further clockwise as indicated at 521" due to interaction with top edge subregion 523 and now point to the left. The angle difference between the central magnetic orientations, 511" and 521" is now 180 degrees. The cosine of this angle difference is −1.0 (cos {180°}=−1.0).

At the fourth snapshot S-554, the head to medium relative position has advanced to $Z_R=4$, and the underlying media excitation field 554 has flipped in direction, now pointing upwardly with slight intensity. The magnetic orientations of domains in edge subregions 512–514, 522–524 remain unchanged due to hysteresis. The magnetic orientations of domains in the central subregion of the first GMR layer 510 have rotated further counterclockwise due to interaction with the media excitation field 554 and now point up and to the right. The magnetic orientations of domains in the central subregion of the second GMR layer 520 have rotated further clockwise due to interaction with the media excitation field 554 and now point up and to the left.

At the fifth snapshot S-555, the head to medium relative position has advanced to $Z_R=5$, and the underlying media excitation field 555 has increased in intensity and continues to point upwardly. The magnetic orientations of domains in edge subregions 514 and 522 remain unchanged but portions of the edge subregions previously referred to as 512 and 524 begin to flip in response to the strengthened intensity of media excitation field 555.

More specifically, as seen in snapshot S-555, the subregion walls of original subregions 512 and 524 have retracted to new configurations 512' and 524'. New subregions (or 'bubbles') 552 and 554 now appear in the flipped-over edge subregion portions with magnetic orientations pointing up instead of down.

Magnetic domains in the edge subregions cannot rotate due to boundary conditions and instead change their orientations by flipping. The flipping mechanism advances in a discontinuous manner in accordance with the well-known Barkhausen effect in each of the GMR layers 510 and 520. At any given instant, a flip can occur within an edge portion of one of the GMR layers 510 and 520 without having a symmetrically countering flip occurring at the same instant of time in the other of GMR layers 510 and 520. This unbalanced flipping of domains at the edge subregions is believed to introduce a random noise factor into the change of resistance of the GMR element.

At the sixth snapshot S-556, the head to medium relative position has advanced to $Z_R$=6, and the underlying media excitation field 556 has increased in intensity while continuing to point upwardly. The magnetic orientations of domains in central subregions 511''' and 521''' have now rotated into alignment with the media excitation field 556. The magnetic orientations of domains in edge subregions 514 and 522 now begin to also change in response to the strengthened intensity of media excitation field 556 and interaction with the domains in central subregions 511''' and 521'''.

More specifically, as seen in snapshot S-556, the subregion walls of original subregions 512 and 524 have retracted even further and the newer subregions ('bubbles') 552 and 554 have become substantially larger. At the same time, the subregion walls of original subregions 514 and 522 have retracted to new configurations 514' and 522'. New subregions (or 'bubbles') 562 and 564 have now appeared with magnetic orientations pointing up instead of down. The expansion of new subregions ('bubbles') 562 and 564 is discontinuous and nonsymmetrical just as the case with older bubbles 552 and 554.

At the seventh snapshot S-557, the head to medium relative position has advanced to $Z_R$=7, and the underlying media excitation field 557 has reached maximum intensity while continuing to point upwardly. The magnetic orientations of domains in both the central (main) subregions and the left and right edge subregions of GMR layers 510 and 520 now all point upwardly in alignment with the underlying media excitation field 557. Domains in the top edge subregions 513 and 523 of respective GMR layers 510 and 520 continue to point opposingly to the right and left respectively.

The magnetization conditions in seventh snapshot S-557 are now basically the same as that in first snapshot S-551 except that magnetic orientations in the central and edge subregions are upward rather than downward. The response to a next flipping of the media excitation field will follow a similar path as that of snapshots S-551 to S-557 except that the up/down orientations will be reversed and rotations of the central subregions will also be reversed.

Note that the angle difference between the central magnetic orientations, 511 and 521 is zero in seventh snapshot S-557 just as it was in snapshot S-551 and the cosine of this angle difference is +1.0 (cos{0°}=+1.0).

FIG. 5B plots the cosine-like response of the unbiased GMR element to variation in the excitation field strength. This response, as seen, is a function of the cosine of the angle difference between the magnetic orientations of the central (main) subregions of the GMR layers 510 and 520 as those layers sweep through a transition of the media excitation field. The resistance of the GMR element is roughly proportional to the cosine of the angle difference between the magnetic orientations of the central subregions of its alternating GMR layers.

The vertical axis of FIG. 5B shows magnetoresistive response to the medium excitation field in terms of resistance or voltage. The horizontal axis of FIG. 5B shows the strength of the medium excitation field in terms of milli-EMU's (electromagnetic units) per centimeter squared. The field strength position of 0 mEMU/cm$^2$ corresponds to third snapshot S-553 in FIG. 5A. The field strength position of −1.2 mEMU/cm$^2$ corresponds to first snapshot S-551 in FIG. 5A. The field strength position of +1.2 mEMU/cm$^2$ corresponds to seventh snapshot S-557 in FIG. 5A.

Note in FIG. 5B that the most nonlinear portion of the cosine-like response curve (f[cos{180°}]) is positioned over the field strength position of 0 mEMU/cm$^2$ (S-553). Note that this portion of the cosine-like response curve (f[cos{180°}]) is also the one with the minimum slope. This means that the response of the unbiased GMR element to an oscillating excitation field of very small magnitude is relatively nonlinear and becomes more nonlinear as the magnitude of the oscillating excitation field decreases. It also means that the gain of the unbiased GMR element decreases as the magnitude of the oscillating excitation field decreases. Both of these characteristics are disadvantageous, particularly when one is trying to detect magnetic transitions of relatively low strength.

FIG. 5C plots the output voltage or resistance of the non-biased GMR element as the GMR element is excited by a sinusoidally oscillating excitation field prerecorded on the medium. The vertical axis of FIG. 5C shows magnetoresistive response to the external excitation field while the horizontal axis shows position along a media track in terms of microns. The pre-recorded excitation signal is assumed to be a square wave with a period of 3 microns and a magnitude swinging symmetrically both positive and negative (north and south).

The $Z_R$ position in FIG. 5C to the right of 0.0 microns corresponds to snapshot S-551 of FIG. 5A. Response latency is due to hysteresis. The $Z_R$ position to the right of 0.75 microns corresponds to snapshot S-553 of FIG. 5A. The $Z_R$ position to the right of 1.5 microns corresponds to snapshot S-557 of FIG. 5A. Note that the output at approximately 0.0 microns (S-551) is undifferentiated from that at approximately 1.5 microns (S-557) even though the excitation field is of opposite polarity at these respective locations. It is not possible to tell from the output of the GMR element whether the detected magnetic transition is from down to up, or from up to down. Polarity information within the prerecorded magnetic signal does not pass through to the output of the unbiased GMR element.

FIGS. 2A through 2C respectively provide a set of 'after' diagrams for the case where the GMR element is biased by biasing element 180.

FIG. 2A shows magnetic orientations for the case of the medium excitation field pointing fully down (snapshot S-251), for the case of the medium excitation field being neutral (snapshot S-253) and for the case of the medium excitation field pointing fully up (snapshot S-257). Down pointing arrow 281 represents the biasing field. The biasing field is such that in the neutral external-excitation state (snapshot S-253), the main (central) magnetic orientations define a 'scissor' configuration when overlaid on top of one another. The major domain region of a first layer of the MR element is preferably biased so as to be rotated +45° relative to its unbiased orientation by the bias field. The major domain region in an adjacent second layer of the MR element is preferably biased so as to be rotated −45° relative to its unbiased orientation by the bias field. This produces an angle difference of approximately 90 between the major domain regions of the first and second layers due to the bias. The cosine of this bias-induced angle difference (90°) is approximately zero.

Note that in each of the magnetization states, S-251, S-253, S-257, of FIG. 2A (biased GMR element), the orientation of the edge subregions remain substantially unchanged. There is essentially no flipping of domains at the edges of the biased GMR element and thus the problem of random noise being introduced due to the Barkhausen effect is obviated.

It is to be understood that the results shown in FIGS. 5B, 5C, 2B, 2C are not pure cosine curves but rather the results of a computer simulation. In the simulation set up, a tri-layer GMR element was assumed consisting of magnetic/conductive/magnetic layers each 2 nanometers in thickness with a Y-direction width of 0.5 micron and an X-direction length of 0.25 micron. The medium signal was represented as having a perfect square pulse with 90° rising and falling edges recorded thereon over a duration of 1.5 microns. A 30 nm magnetic spacing between the surface of the medium and the head ABS was assumed. A permanent magnetic bias of strength MrT=0.45 memu/cm$^2$ was assumed extending in the −X direction for the results respectively labeled as "biased".

As seen in FIG. 5C (not-biased), the read-back voltage at the rising edge of the square pulse ($Z_R$=0.0 micron) is indistinguishable from the read-back voltage at the falling edge of the square pulse ($Z_R$=1.5 micron) because they are of the same polarity and magnitude. If an upward spike of noise were introduced at the time of say, $Z_R$=1.0, it would be difficult to separate signal from noise.

As seen by contrast in FIG. 2C (biased), the read-back voltage at the rising edge of the square pulse ($Z_R$=0.0 micron) is clearly distinguishable from the read-back voltage at the falling edge of the square pulse ($Z_R$=1.5 micron) because they are of opposite polarity. If an upward spike of noise were introduced at the time of say, $Z_R$=1.0, it would be relatively easy to separate signal from noise using alternating polarity as a basis for filtering.

Note in FIG. 2B that the most linear portion of the cosine-like response curve (f[cos{90°}]) is positioned over the field strength position of 0 mEMU/cm$^2$ (S-253). Note that this portion of the cosine-like response curve (f[cos{90°}]) is also the one with the maximum slope. This means that the response of the biased GMR element to an oscillating excitation field of very small magnitude is relatively linear and becomes more linear as the magnitude of the oscillating excitation field decreases. It also means that the gain of the biased GMR element increases as the magnitude of the oscillating excitation field decreases. Both of these characteristics are highly advantageous, particularly when one is trying to detect magnetic transitions of relatively low strength.

Figure 6:
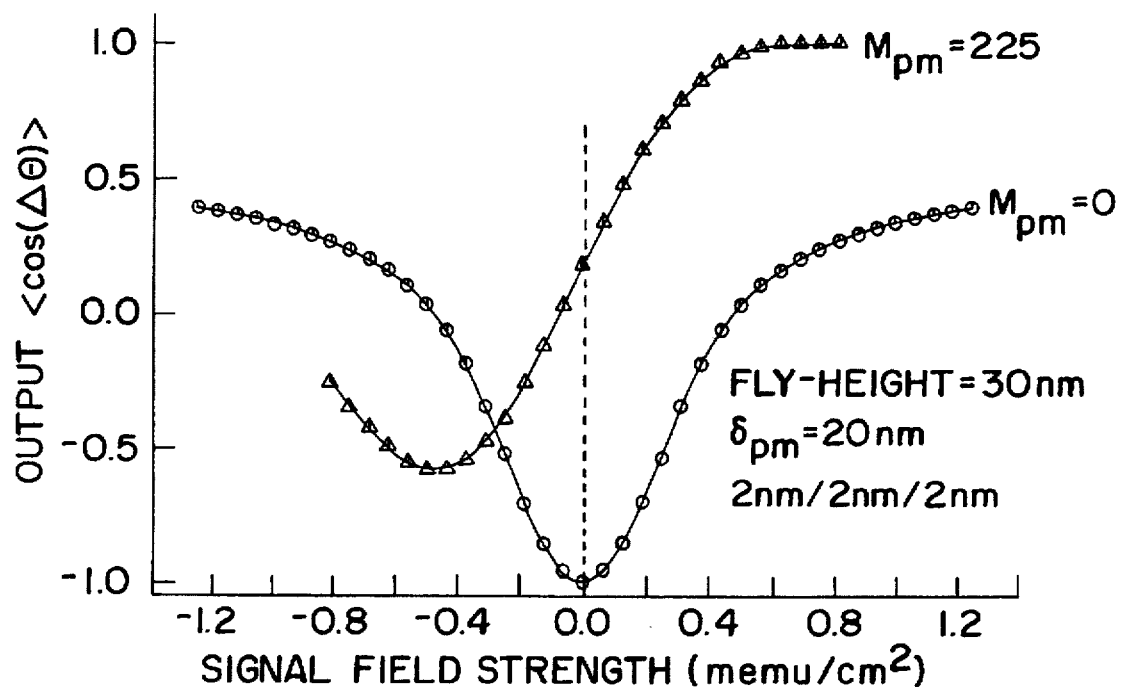
FIG. 6 is a comparative plot of the cosine-like responses of the unbiased and magnetically biased GMR elements to varying flux intensity.

The comparative transfer curve characteristics for the non-biased and biased cases is best seen in FIG. 6 where the circles represent the non-biased arrangement and the triangles represent the biased arrangement. The region of key interest is that about the field strength equals zero axis (dashed vertical line). An oscillatory excitation field of relatively low strength will provide a much more linear response and a greater output swing for the case of the biased GMR element as compared to that of the non-biased GMR element, all other factors being equal.

The biasing field (281 of FIG. 2A) can be provided by a permanent magnet, or a combination of a pre-oriented exchange layer and a soft layer, or an electric current source which induces the magnetic bias field, or a combination of one or more of these bias-providing means. The permanent magnet can be used in the case where there is no strong write fields to permanently disturb the magnetization of the magnet. For the case where strong write fields are expected to pass through the bias providing means, use of a recoverable biasing system such as a combination of a pre-oriented exchange layer (antiferromagnetic layer) and a soft layer (ferromagnetic layer) is preferred.

Figure 3A:
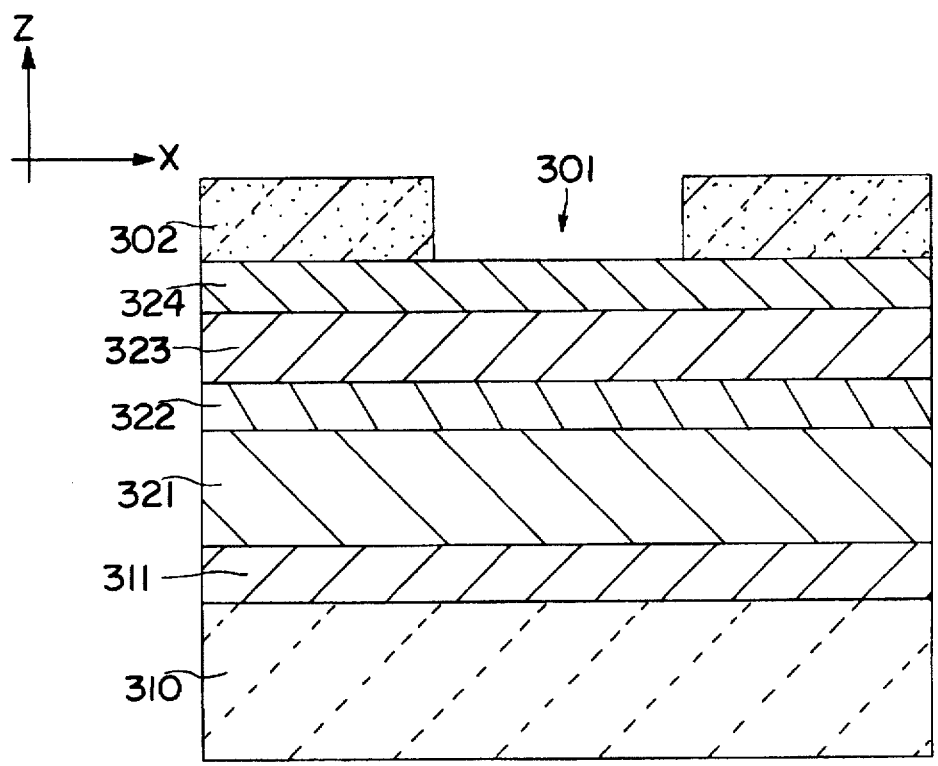
FIG. 3A is a cross-sectional side view showing a first step in a method for manufacturing a biased GMR head in accordance with the invention wherein a patterned photoresist mask is provided over a plurality of deposited layers.

Referring to FIG. 3A, a method for manufacturing a biased GMR head in accordance with the invention will be described. Where possible, like reference numerals in the "300" number series are used for components having like counterparts numbered in the "100" series in FIGS. 1A and 1B.

The following layers are deposited by sputtering, or CVD (chemical vapor deposition) or other appropriate deposition methods onto a ceramic substrate 310 preferably in the recited order: an optional base insulating layer 311 made of an EN/MN material; a first pole/shield layer 321 made of an EC/MC material; a first contact layer 322 made of an EC/MN material; a GMR layer 323 made of alternating ultra-thin films of EC/MN and EC/MC materials; a second contact layer 324 made of an EC/MN material; and a patterned first photoresist layer 302 having a photolithographically defined aperture 301 extending vertically therethrough.

Figure 3B:
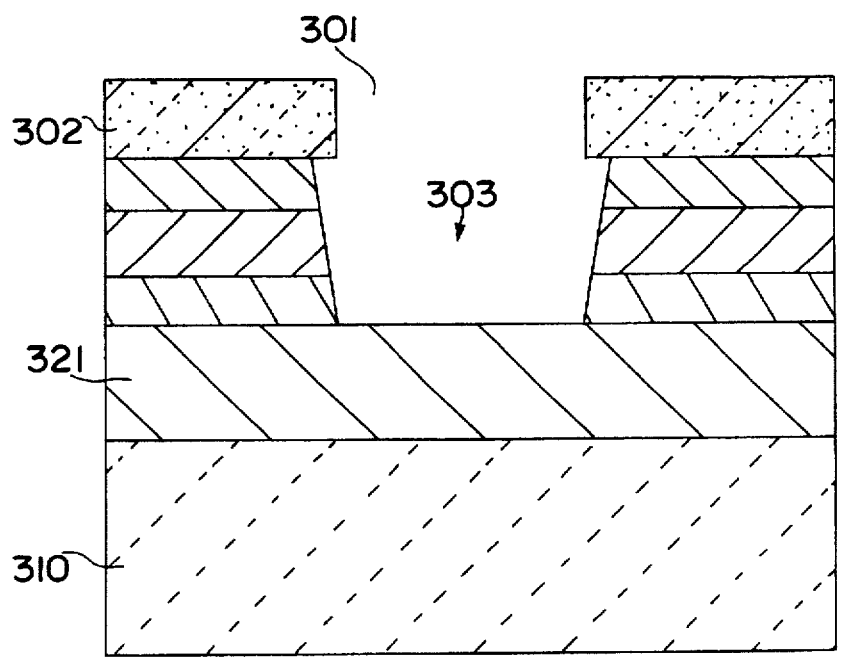
FIG. 3B is a cross-sectional side view showing a second step wherein a cavity is milled.

Referring next to FIG. 3B, aperture 301 is used to form a cavity 303 extending through layers 322 through 324. (For illustrative brevity, the optional base insulating layer 311 is no longer shown but is understood to be formed, if present, on the top surface of substrate 310.) The Y direction width of the cavity 303 is equal to or greater than that of the to-be-formed GMR element at the left side of the cavity. The X direction length of the cavity 303 is preferably longer than the ultimate length of the GMR element and more preferably 5 to 10 times the ultimate length. The cavity 303 can be milled using for example, argon ion milling or reactive ion etching (RIE), the methods being picked as appropriate for the material of each of layers 322–324. The cavity formation will typically have some isotropic side cutting, and as such sloped sidewalls may result as illustrated. The slope tangent is roughly in the range 1:1 to 2:1 (delta Z: delta X).

Figure 3C:
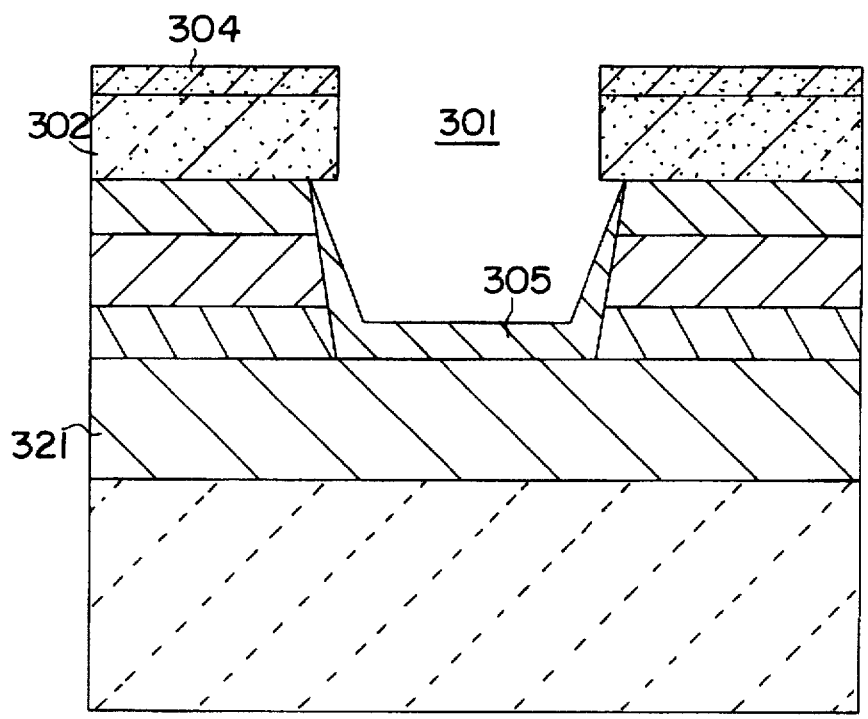
FIG. 3C is a cross-sectional side view showing a third step wherein an insulating layer is deposited.

In FIG. 3C, a thin film of EN/MN material such as RF-sputtered Al$_2$O$_3$ (aluminum oxide) is deposited. Part of the EN/MN material adheres to the top of layer 321 and the sidewalls of layers 322–324 as illustrated at 305. The remainder adheres to the top of the first photoresist layer 302 as shown at 304. The inside-cavity portion 305 of the EN/MN thin film will be referred to below as the first insulating layer 305.

When the next-described antiferromagnetic material 306–307 is made to be electrically insulating, then the first insulating layer 305 may be omitted.

Figure 3D:
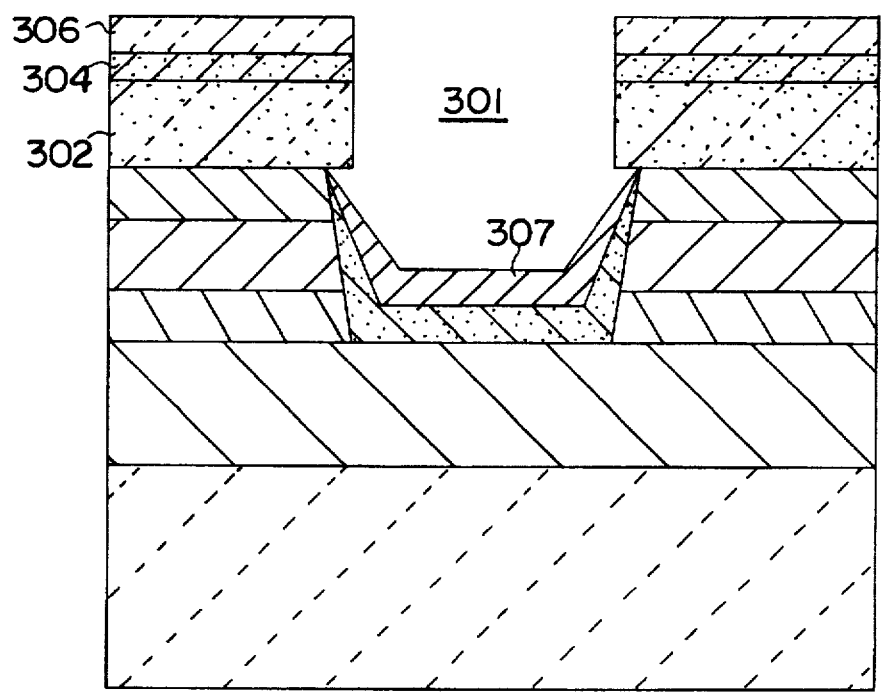
FIG. 3D is a cross-sectional side view showing a fourth step wherein an antiferromagnetic exchange layer is deposited.

In FIG. 3D, a thin film of antiferromagnetic material such as NiCoO or MnFe or TbCo or MnNi is deposited as indicated at 306 and 307. The cavity-internal portion 307 of the anti-ferromagnetic thin film will be referred to below as the exchange layer 307. The magnetic domain orientations of the exchange layer 307 are directed along the X direction by applying a like-oriented external field either during deposition or during a post-deposition high-temperature anneal.

Figure 3E:
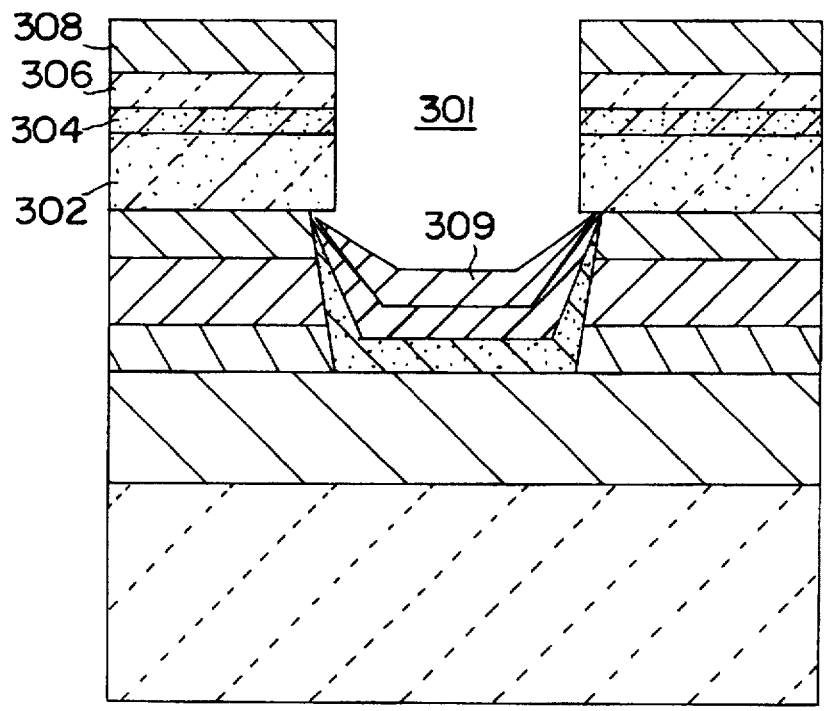
FIG. 3E is a cross-sectional side view showing a fifth step wherein a soft magnetic layer is deposited.

In FIG. 3E, a thin film of soft ferromagnetic material such as Permalloy is deposited as indicated at 308 and 309. The cavity-internal portion 309 of the ferromagnetic thin film will be referred to below as the bias layer 309. Note that the bias layer 309 is at least partially in the XY plane of the GMR layer 323. Antiferromagnetic coupling across the XY boundary of the exchange layer 307 and the bias layer 309 causes the magnetic domains of the bias layer 309 to orient themselves along the X direction, thus applying a magnetic bias in the X direction to the GMR element 323. The magnetic bias might be temporarily disrupted when write fields are generated between the first pole/shield layer 321 and the to-be-formed third pole/shield layer 326 (FIG. 3K) but the orientation of the exchange layer 307 is unaffected and snaps the orientation of domains in the bias layer 309 back into the X direction after writing (recording) completes.

In cases where the device is not used for magnetic recording (writing) or the magnetic write fields are of sufficiently low intensity not to neutralize it, a permanent magnet (not shown) may be used in place of the combination of the exchange layer 307 and the bias layer 309.

As long as the bias layer 309 is at least partially in the XY plane of the GMR layer 323, it makes little difference in terms of operation whether bias layer 309 is on top of the exchange layer 307 or vise versa. For some cases it may be advantageous to reverse the deposition order, putting the bias layer 309 down first and the exchange layer 307 down second, on top of the bias layer 309. The soft magnetic material of the firstly laid-down bias layer 309 can provide improved crystallographic boundary alignment for the secondly deposited exchange layer 307 in such a case.

For the case where the exchange layer 307 is made of an electrically conductive material, and the bias layer 309 is made of an insulating material, it may be advantageous to eliminate the deposition of one or both of the first insulating layer 305 (FIG. 3C) and a below-mentioned second insulating layer 313 (FIG. 3F), however both insulating layers, 305 and 313, should be employed in order to best assure that electrical current will not leak through the biasing element 180 (FIG. 1A).

Figure 3F:
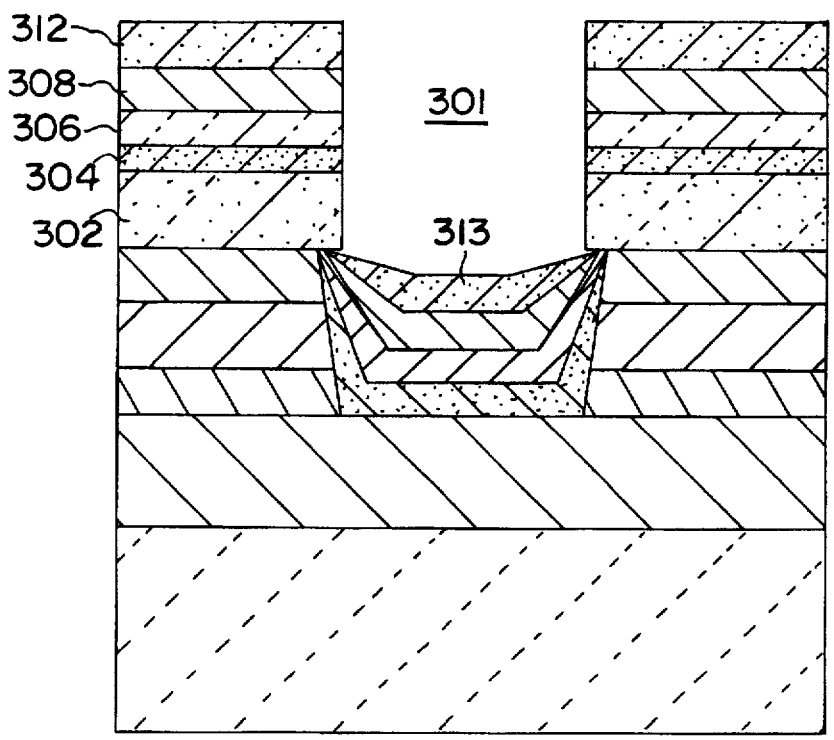
FIG. 3F is a cross-sectional side view showing a sixth step wherein another insulating layer is deposited.

In FIG. 3F, a further magnetically and electrically non-conductive material (EN/MN) is deposited, the portion passing through first photoresist layer 301 forming a second insulating layer 313 and having a top surface approximately coplanar with the top surface of the second contact layer 324 (FIG. 3A). The remainder of the EN/MN material forms on top of the bias layer material 308 as shown at 312.

Figure 3G:
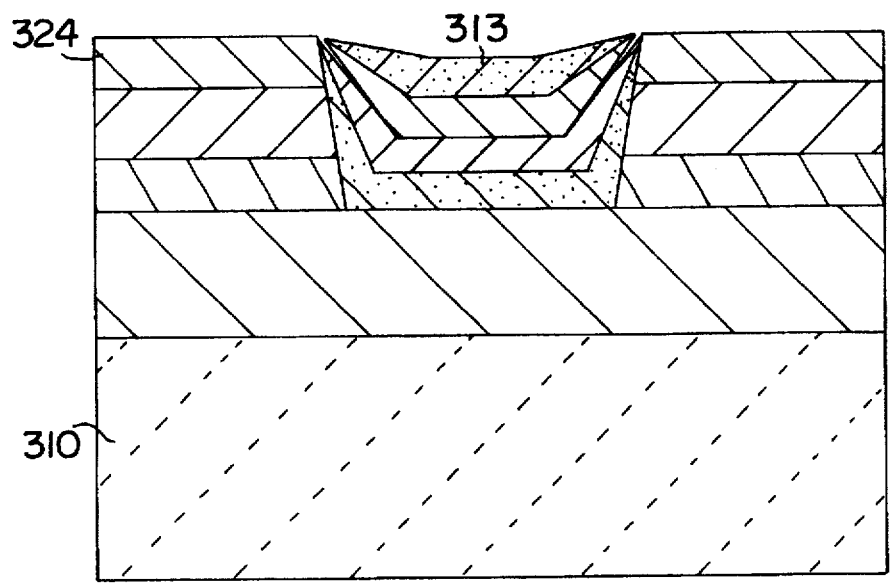
FIG. 3G is a cross-sectional side view showing a seventh step wherein the first photoresist layer is removed.

Referring to FIG. 3G, an appropriate solvent is next used to dissolve the first photoresist layer 302 and float-away the overlying materials indicated in FIG. 3F as 304, 306, 308 and 312. This leaves behind the generally planar structure having the second contact layer 324 and second insulating layer 313 forming its upper surface.

Figure 3H:
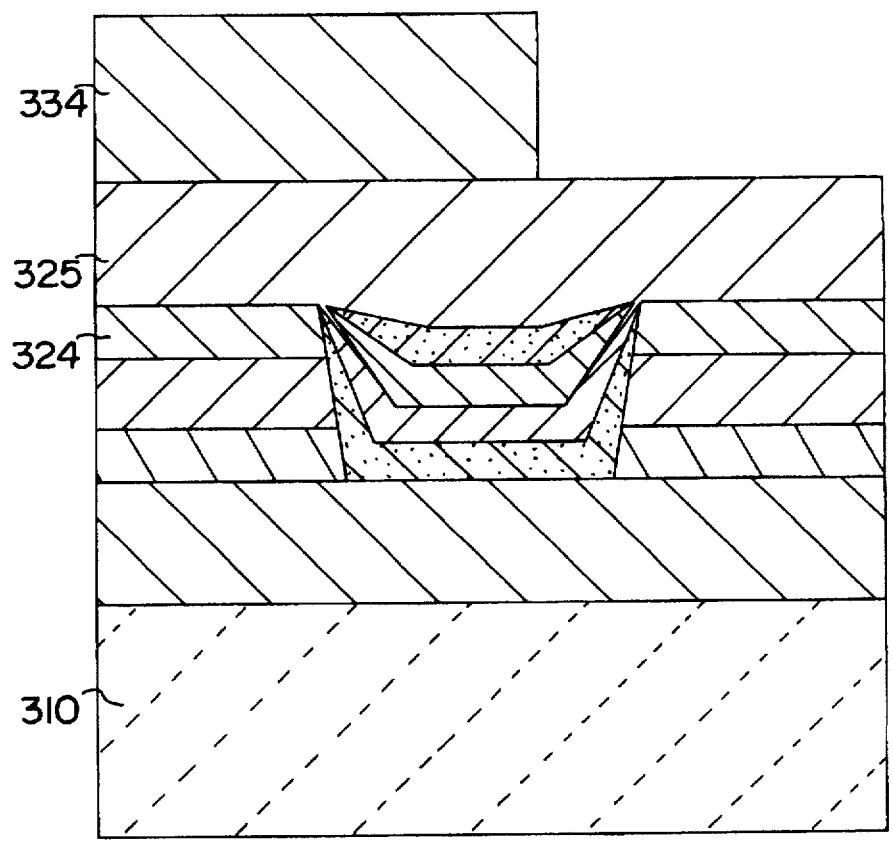
FIG. 3H is a cross-sectional side view showing an eighth step wherein an upper pole layer has been deposited and a second photoresist layer has been deposited and patterned.

Referring to FIG. 3H, a second pole/shield layer 325 is deposited. A second photoresist layer 334 is thereafter deposited and patterned as shown to leave exposed the back portion of the structure while masking the front portion.

Figure 3I:
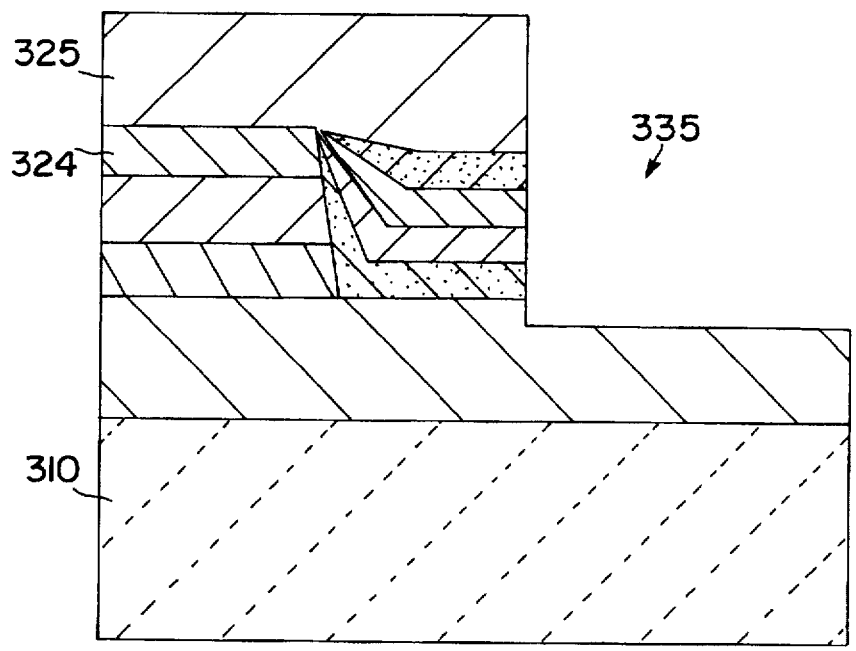
FIG. 3I is a cross-sectional side view showing a ninth step wherein unmasked material is removed.

Referring to FIG. 3I, the second photoresist layer 334 is used for milling away the material previously occupying area 335. The milling operation cuts approximately to the top of the first pole/shield layer 321 or slightly below. One or a combination of argon ion milling and RIE and other anisotropic etching methods may used, as appropriate in accordance with the materials chosen for layers 321–325 and 305–313, for forming the cutout 335.

The second photoresist layer 334 (FIG. 3H) is next removed to leave the structure shown in FIG. 3I.

Figure 3J:
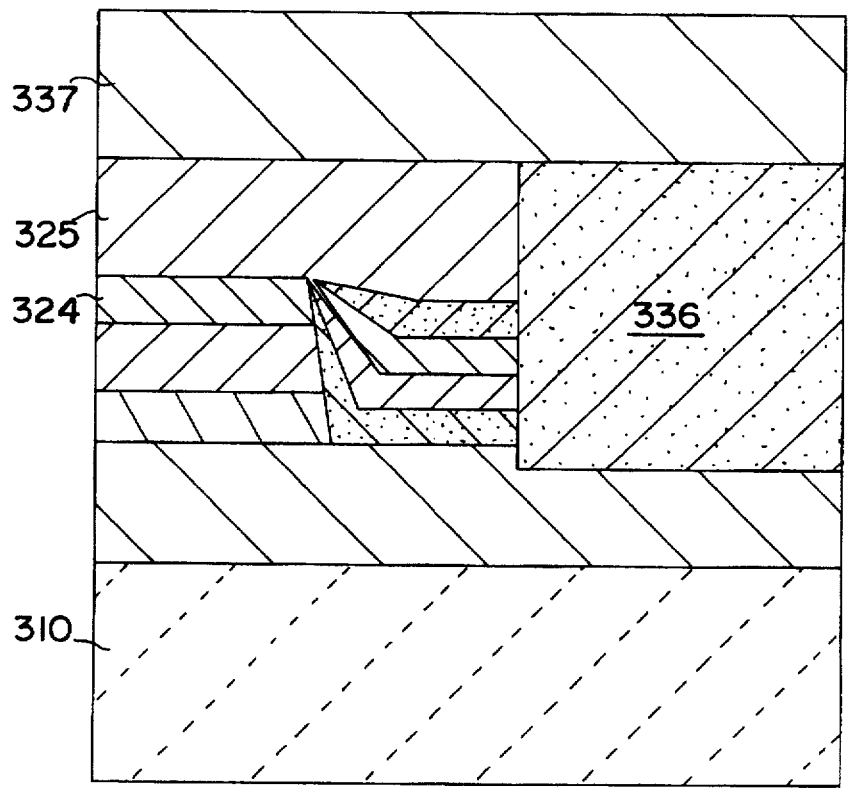
FIG. 3J is a cross-sectional side view showing a tenth step wherein an additional insulating layer is deposited and planarized, followed by a third patterned photoresist layer.

Referring to FIG. 3J, a third insulating layer 336 made of an EN/MN material is next deposited on the structure of FIG. 3I and planarized. A third photoresist layer 337 is thereafter deposited onto the third insulating layer 336 top of second pole/shield layer 325 and patterned to define the Y-direction width of the stem portion of the I-beam front view of FIG. 1B.

Figure 3K:
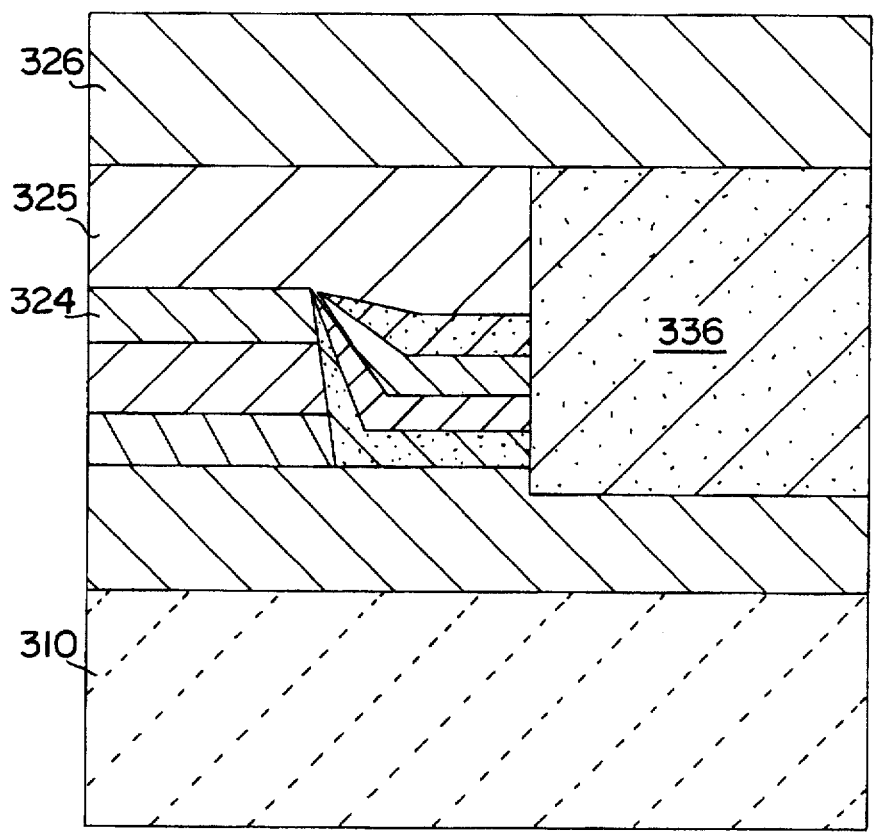
FIG. 3K is a cross-sectional side view showing an eleventh step wherein the stem portion of the I-beam front view has been patterned, the third photoresist layer removed, fill material (not shown) has been added about the stem portion of the I-beam front view, and a wide upper pole layer thereafter deposited to form the top of the I-beam front view.

Referring to FIG. 3K, the EN/MN side support material 170 of FIG. 1B is next deposited and the structure is again planarized. Thereafter, a further photoresist layer (not shown) is deposited and patterned to straddle in the Y-direction the structure shown in FIG. 3K so that the material of the third pole/shield layer 326 may be deposited as shown. The third pole/shield layer 326 is composed of the same or a substantially similar composition as that used for the first and second pole/shield layers, 321 and 325.

Other portions of the head, such as the planar write coil (140) may be formed after or during the above steps in accordance with known methods. It is to be understood that in a mass production environment, the structure of FIGS. 3A–3K is reproduced many times across each of plural wafers and individual read/write heads are diced out from each wafer at the end of the process. Accordingly, an economic method for mass-producing compact, CPP-type, biased magnetoresistive heads is provided.

Figure 4:
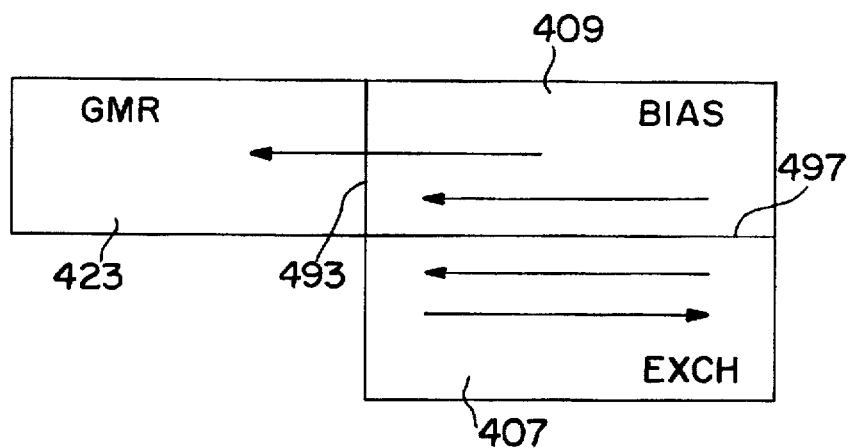
FIG. 4 is a cross-sectional side view showing magnetic intercoupling from the exchange layer to the soft bias layer and from there into the GMR element.

FIG. 4 provides a closer view of the mechanism by which a GMR element 423 is biased even though it is periodically exposed to write flux transitions that tend to demagnetize it. Exchange layer 407 is preoriented so that the magnetic domains of its antiferromagnetic material point opposingly in the X direction (in the direction of a line extending from the GMR element 423 to an adjacent medium surface (not shown). Surface coupling at the boundary 497 between the exchange layer 407 and the ferromagnetic bias layer 409 produces magnetic domains pointing unidirectionally along the X direction within the ferromagnetic bias layer 409. The flux of these unidirectionally pointed domains extends across boundary 493 into the GMR element 423 to thereby bias the GMR element 423. The orientation of opposingly directed domains within the antiferromagnetic exchange layer 407 are not permanently disturbed by application of write flux, and hence the bias is maintained during read mode even if the head had been previously used to generate relatively strong write pulses.

It should be understood that the invention is not limited to the specific parameters and materials described above. Various modifications and variations may be made within the scope of the invention.

What is claimed is:

1. A magnetic head for detecting transitions in a magnetically recorded magnetic medium having magnetically oriented regions comprising:

spaced first and second magnetic pole/shield layers for providing a magnetic path and for providing magnetic shielding;

a giant magnetoresistive structure formed with a top planar major surface and a bottom planar major surface disposed between said magnetic pole/shield layers for coupling magnetically with an oriented region of said medium to sense said transitions recorded on said magnetic medium, said surfaces being parallel to said magnetic pole/shield layers, said giant magnetoresistive structure having main domain regions therein;

a first conductive contact element disposed between said first pole/shield layer and said giant magnetoresistive structure and a second conductive contact element disposed between said second pole/shield layer and said giant magnetoresistive structure;

permanent magnet biasing means adjacent to and in contact with said giant magnetoresistive structure for magnetically biasing the orientation of said main domain regions;

wherein said giant magnetoresistive structure operates in a current perpendicular-to-plane mode so that sense current moves substantially perpendicularly relative to said planar major surfaces of said giant magnetoresistive structure.

2. A magnetic head for detecting transitions in a magnetically recorded magnetic medium having magnetically oriented regions comprising:

spaced first and second magnetic pole/shield layers for providing a magnetic path and for providing magnetic shielding;

a giant magnetoresistive structure formed with a top planar major surface and a bottom planar major surface disposed between said magnetic pole/shield layers for coupling magnetically with an oriented region of said medium to sense said transitions recorded on said magnetic medium, said surfaces being parallel to said magnetic pole/shield layers, said giant magnetoresistive structure having main domain regions therein;

a first conductive contact element disposed between said first pole/shield layer and said giant magnetoresistive structure and a second conductive contact element disposed between said second pole/shield layer and said giant magnetoresistive structure;

biasing means adjacent to and in contact with said giant magnetoresistive structure for magnetically biasing the orientation of said main domain regions;

wherein said giant magnetoresistive structure operates in a current perpendicular-to-plane mode so that sense current moves substantially perpendicularly relative to said planar major surfaces of said giant magnetoresistive structure, wherein said giant magnetoresistive structure comprises magnetoresistive layers that are magnetically biased so that the major domains of said layers define a scissor-type configuration when no excitation field is supplied by an adjacent medium.

3. A magnetic head as in claim 2, wherein the major domain region of a first magnetoresistive layer is biased to be rotated +45° relative to its unbiased orientation, and the major domain region in an adjacent second magnetoresistive layer is biased to be rotated −45° relative to its unbiased orientation.

4. A magnetic head as in claim 2, wherein said biasing means comprises a soft magnetic element positioned adjacent to said giant magnetoresistive structure, and an antiferromagnetic exchange element positioned adjacent to said soft magnetic element.

5. A magnetic head for detecting flux transitions in a magnetic medium having magnetically recorded data signals characterized by magnetically oriented regions comprising:

a ceramic substrate;

a first pole/shield layer formed on said substrate and a second pole/shield layer formed above and spaced from said first pole/shield layer for forming a magnetic path with a transducing gap defined therebetween for recording data signals on said magnetic medium;

a magnetoresistive structure having magnetoresistive layers that are magnetically conductive, alternating with layers that are not magnetically conductive, said magnetoresistive layers being stacked one above the other, adjacent layers being in contact with each other, said magnetoresistive structure being disposed between said pole/shield layers, said structure being in proximity with said recorded magnetic medium for reading data signals from said magnetic medium during a reading mode and for operating with a current flowing perpendicularly through the major planes of said magnetoresistive layers;

contact elements that are electrically conductive and magnetically nonconductive disposed between said first and second pole/shield layers and said magnetoresistive structure respectively;

magnetic biasing means in direct contact with and magnetically coupled to said magnetoresistive structure for biasing said magnetoresistive structure wherein the major domains of said magnetoresistive layers define a scissor type configuration in the absence of an excitation field from said medium.

6. A magnetic head as in claim 5, wherein said magnetic biasing means is a permanent magnet.

7. A magnetic head according to claim 5 wherein the magnetoresistive structure comprises a GMR element.

\* \* \* \* \*